May 25, 1954     H. GRAY     2,679,277
TIRE SIDEWALL CONSTRUCTION
Filed Nov. 10, 1948
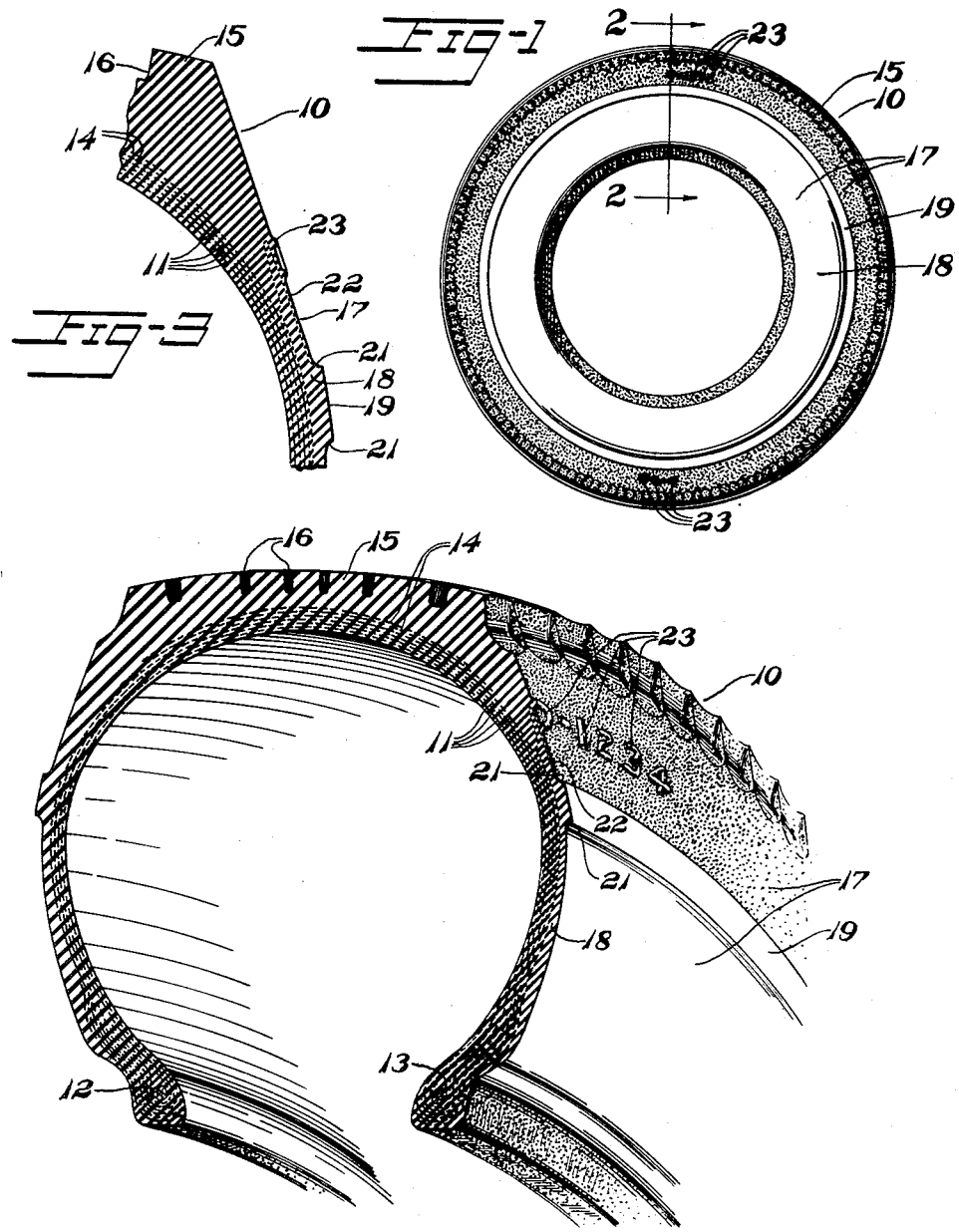
Inventor
Harold Gray
By Harold S. Meyer
Atty Patented May 25, 1954

2,679,277

UNITED STATES PATENT OFFICE 2,679,277

TIRE SIDEWALL CONSTRUCTION

Harold Gray, Akron, Ohio, assignor to The B. F. Goodrich Company, New York, N. Y., a corporation of New York Application November 10, 1948, Serial No. 59,252

2 Claims. (Cl. 152—330)

This invention relates to tire sidewalls and especially to the construction of tires with white sidewalls. The incorporation of white sidewalls in tires presents problems in production and service which are not encountered with tires which are completely black. The white rubber of the sidewalls has less tear resistance than black rubber as a reinforcing agent other than carbon black must be used and this agent cannot impart to the white rubber the excellent tear resisting qualities carbon black imparts to black rubber. Consequently the white rubber is more susceptible to cracking and the cracks starting in the white rubber have a greater tendency to grow than similar cracks starting in black rubber. The cracks which appear in the white sidewall of a tire are more objectionable than cracks in black sidewalls because they grow to larger proportions and weaken the tire, and the dirt which collects in the cracks stands out against the white background detracting from the appearance of the tire.

The position of the tire markings on the white sidewall has also been undesirable because the raised letters and numerals on the white sidewall hold dirt and other foreign material which stain the tire at the markings and streak the tire when the dirt dissolves and flows over the sidewall. The markings are difficult to clean because they do not have sufficient toughness to withstand cleaning by abrasive carrying buffing wheels which are needed in factory finishing the tires, to clean the sidewalls in general and particularly the markings.

The presence of the raised markings on the white sidewall also interferes with rapid finishing of the tire as time-consuming care must be taken not to damage the markings when the buffing strip or curb strip of the sidewall is ground away by a buffing wheel to produce a clean line of demarcation between the black and white rubber of the sidewall. In service it has also been found that the markings are in a position where they are easily damaged by scuffing when the tire rubs against an obstacle such as a curb.

To eliminate the foregoing and other difficulties the applicant has provided a construction in which the white sidewall has greater resistance to cracking and in which the markings do not adversely affect the color and appearance of the white sidewall. The new construction also provides protection for the identification markings in production and in service.

Objects of the invention are to provide an improved tire construction, to provide for increasing the crack resistance of the tire sidewall, to provide identifying markings on the tire sidewall at a position where they are least susceptible to mutilation, to provide white sidewalls having a longer life and improved appearance, to provide identifying markings at the portion of the tire having a minimum of flexing, to provide a white sidewall tire which has identifying markings disposed at a position remote from the white sidewall, and to provide for ease of production and convenience of maintenance without detracting from the appearance of the tire.

Other objects will be apparent from the following description, reference being had to the drawings in which:

Fig. 1 is an elevation of a tire constructed in accordance with and embodying the invention.

Fig. 2 is a section taken along line 2—2 of Fig. 1 on an enlarged scale showing a portion of the tire in perspective.

Fig. 3 is a section like Fig. 2 on an enlarged scale, parts being broken away.

Referring to the drawings, the invention is applied to a tire 10 suitable for truck or passenger vehicle use, it being understood that the number of plies and bead construction may be varied in accordance with the requirements of the intended use. The tire 10 comprises inextensible beads 12 and 13 in the wheel engaging portions and a plurality of reinforcing plies 11, 11 extending from bead to bead and folded about the beads to anchor the plies securely. Breaker plies 14, 14 may be disposed radially outward of the reinforcing plies 11, 11 with margins terminating short of the bead portion. The plies 11, 11 and 14, 14 are preferably of cord insulated by a coating of rubber or other rubber-like material, the plies being arranged in cross-relation.

Outward of the breaker plies 14, 14 at the outer circumference of the tire 10 a tread portion 15 is disposed which comprises an annular body of resilient rubber or other rubber-like material and preferably of rubber containing carbon black to increase the wearing properties of the material. The tread portion may have grooves 16, 16 in the ground engaging surface to provide better gripping of the road.

In accordance with the invention a facing 17 is provided outward of the plies 11, 11 on a sidewall of the tire 10 between the tread portion 15 and the bead 13. The facing 17 may be a sheet of the tread material, however, the invention is of greater importance when the facing comprises a sheet of resilient material which does not contain carbon black such as a sheet of white rubber 18 shown in the drawing. The sheet of white rubber 18 is bonded to the coating of the plies 11, 11 and extends from the wheel-engaging portion radially outward of the tire 10 and overlaps an edge of the tread portion 15.

In building the tire the sheet of white rubber 18 is wrapped around the plies and one edge is aligned with the bead portion of the tire after which the ends of the sheet are disposed in abutted relation to form a continuous band. At the other edge of the sheet of white rubber 18 a sheet of black rubber 22 containing carbon black is wrapped around the tire in overlapping relation with the edge of the white rubber, the edge overlapping the sheet of white rubber being placed at a measured position on the sidewall. The sheet of white rubber is usually of greater width than the sheet of black rubber and in the tire shown in the drawings is over twice the width of the black rubber.

The sheet of white rubber 18 has a circumferentially and radially smooth and continuous surface free from irregularities to eliminate any sharp edges or corners at which cracks tend to start. A circumferentially extending rib 19 may be molded in the tire near the radially outer edge of the sheet of white rubber 18 and at the inner circumference of the sheet of black rubber 22 to protect the tire 10 and facilitate the finishing of the tire. Fillets 21, 21 with large radii are provided at the rib 19 to reduce the tendency of cracks to start at the rib.

In production, the tire 10 is molded with the sheet of black rubber 22 extending part way over the rib 19. Then in finishing the tire 10 the rib 19 is buffed and ground down removing the black rubber from the outermost surface providing a clean cut line of demarcation at the radially outer edge of the rib.

Markings in the form of identifying indicia, that is, letters and numbers, which are required to identify and indicate the size of the tire 10 must be disposed on the outer sidewall of the tire to be seen and in the construction of the invention the markings comprise identifying irregularities in the form of suitable characters such as projections 23, 23 which are shown as numerals and are disposed on the sheet of black rubber 22. If the projections 23, 23 are kept small, say less than one-half the width of the sheet of black rubber 22, the length of the edges where cracks may start will likewise be a minimum. The projections 23, 23 are disposed at the radially outward portion of the sidewall which is thicker than the middle portion because it is contiguous to the thick tread portion 15. This location is particularly desirable because the flexing of the tire is less at this zone than at the portion of the sidewall intermediate the tread and the bead where it projects farthest in the axial direction.

It can be seen that by constructing the tire 10 with the identifying projections 23, 23 in the sheet of black rubber 22 containing carbon black, the possibility of cracks starting at the edges of the projections is small because of the high tear resisting properties conferred by the carbon black. In other resilient materials and in rubber of colors other than black such as white rubber it has not been possible to attain the same high degree of tear resistance and in the past undesirable cracking has commenced at the identifying projections 23, 23 disposed on the sheet of white rubber 18 of the tire 10 at the mid-portion of the sidewall where a large amount of flexing takes place. With the construction of this invention the entire white sidewall of the tire is free and clear of all irregularities and presents a smooth circumferentially uninterrupted surface.

The rib 19 protects the white sidewall from rubbing against curbs and other obstructions which tend to grind dirt into the white surface and protects the identifying projections 23, 23 from scuffing against curbs and other obstacles as the rib projects laterally outward of the projections 23, 23 as shown in Fig. 3. The disposition of the projections 23, 23 is desirable also in that the rib 19 may be buffed in finishing the tire without damaging the identifying projections. The sheet of white rubber 18 may also be cleaned by buffing without damaging the projections 23, 23 which cleaning is difficult when the projections are disposed on the sheet of white rubber.

The identifying projections 23, 23 are further desirable at this position as they increase the traction of the tire when the tire 10 runs on soft ground and sinks to a point covering the identifying projections 23, 23 adjacent the tread portion 15. When this condition arises the projections 23, 23 act as a part of the tread portion 15 and increase the resistance to slippage of the tire.

Variations may be made within the scope of the invention as it is defined in the following claims.

I claim:

1. A tire comprising a resilient, toroidal carcass including marginal wheel engaging bead portions, sidewall portions, and a tread portion; a layer of relatively tough carbon black rubber material bonded to said carcass and including a tread portion formed with traction increasing irregularities and sidewall portions, a circumferential rib projecting from one of said sidewall portions and dividing the corresponding outer side face of the tire into radially inner and outer concentric circumferential areas, the facing of said outer circumferential area being of carbon black rubber, an annular facing layer of rubber substantially free from carbon black and having a color other than black overlying said radially inner concentric area, and identifying indicia comprising letters and numerals projecting from the side face of said tire at the radially outer circumferential area, said identifying indicia being disposed radially inwardly of the traction irregularities of said tread portion and disposed radially outwardly of said rib, whereby the outer surface of said radially inner facing being smooth, circumferentially uninterrupted and free of identifying indicia, is free of any stress localization that might be caused by said indicia.

2. A tire comprising a resilient, toroidal carcass including marginal wheel engaging bead portions, sidewall portions, and a tread portion, a layer of relatively tough carbon black rubber material bonded to said carcass and including a tread portion formed with traction increasing irregularities and sidewall portions, a circumferential rib projecting from one of said sidewall portions and dividing the corresponding outer side face of the tire into radially inner and outer concentric circumferential areas, the facing of said outer circumferential area being of carbon black rubber, an annular facing layer of rubber substantially free from carbon black and having a color other than black overlying said radially inner concentric area, and identifying indicia comprising letters and numerals projecting from the side face of said tire at the radially outer circumferential area, said identifying indicia being disposed radially inwardly of the traction irregularities of said tread portion and disposed radially outwardly of said rib, whereby the outer surface of said radially inner facing being smooth, circumferentially uninterrupted and free of identifying indicia, is free of any stress localization that might be caused by said indicia, the thickness of facing rubber between the indicia in said outer circumferential area and the carcass being substantially thicker than the thickness of rubber between the facing of the rubber at said inner circumferential area and the carcass whereby there is substantially less sidewall flexing at the zone of said indicia than at the one of said inner circumferential area.

References Cited in the file of this patent

UNITED STATES PATENTS

| Number | Name | Date |
| --- | --- | --- |
| 1,093,310 | Carkhuff | Apr. 14, 1914 |
| 1,458,629 | Raymond | June 12, 1923 |
| 1,940,077 | Coe | Dec. 19, 1933 |

FOREIGN PATENTS

| Number | Country | Date |
| --- | --- | --- |
| 486,147 | Great Britain | May 31, 1938 |